United States Patent [19]

Trawick, III

[11] 4,025,922

[45] May 24, 1977

[54] TRAFFIC CONTROL SYSTEM

[75] Inventor: James C. Trawick, III, Melbourne, Fla.

[73] Assignee: Stanley G. Grote, La Mesa, Calif.

[22] Filed: July 7, 1975

[21] Appl. No.: 593,377

[52] U.S. Cl. .......................... 343/6.5 LC; 340/44; 340/407; 340/408

[51] Int. Cl.² ..................... G01S 9/56; G08G 1/07; G08G 1/095

[58] Field of Search ............ 340/3 E, 44, 407, 408; 343/6.5 R, 6.5 LC

[56] References Cited

UNITED STATES PATENTS

| | | | |
|---|---|---|---|
| 2,461,448 | 2/1949 | Smith | 340/407 |
| 2,496,639 | 2/1950 | Richardt, Jr. et al. | 343/12 R X |
| 2,690,547 | 9/1954 | Marks et al. | 340/407 X |
| 3,158,851 | 11/1964 | Ruthven | 340/407 X |

*Primary Examiner*—Malcolm F. Hubler
*Attorney, Agent, or Firm*—William F. Frank

[57] ABSTRACT

A traffic control system particularly suitable for aiding the blind includes an interrogating FM radio transmitter-receiving unit, which can be incorporated into a cane or the like, and a responding FM radio receiver-transmitter unit operatively associated with the traffic signal light control circuits at a street intersection. The interrogating unit transmits an FM signal modulated by a coded signal indicative of which direction its blind operator wishes to cross the intersection. The responding unit, in response to the FM signal received from the interrogating unit, transmits an FM signal modulated by a coded signal corresponding to that received from the interrogating unit whenever the traffic signal light conditions are such that a safe crossing in the desired direction is possible. The interrogating unit produces an audio or mechanical output signal when the coded signal received from the responding unit corresponds to the coded signal it transmitted under the control of its blind operator, this output signal indicating that it is safe to cross the intersection in the desired direction.

15 Claims, 7 Drawing Figures

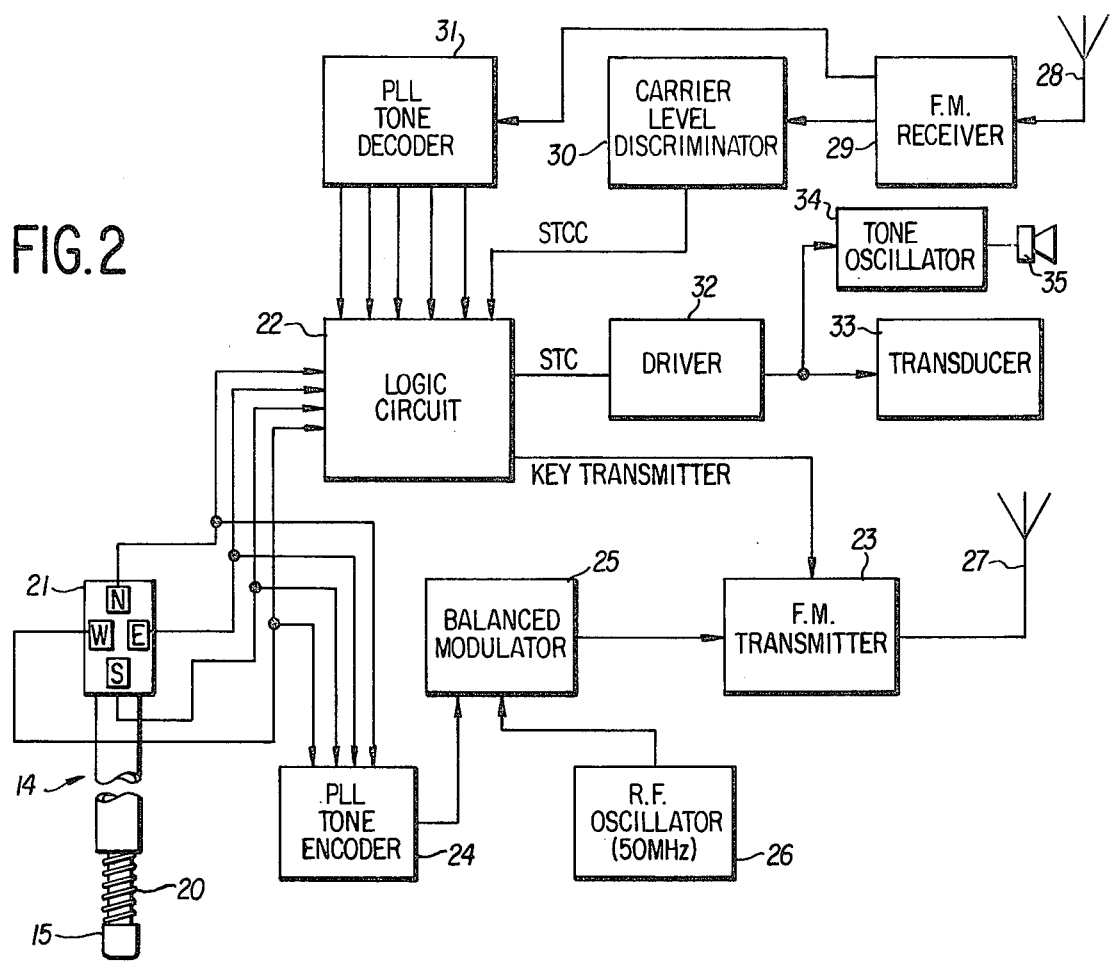

TRAFFIC CONTROL SYSTEM

BACKGROUND OF THE INVENTION

This invention relates to a traffic control system particularly suitable for aiding blind pedestrians to cross street intersections having traffic control lights. The invention relates, more particularly, to a traffic control system for aiding blind pedestrians which includes an interrogating unit incorporated into a cane and a responding unit operatively associated with the traffic signal light control circuits.

Traffic control systems are in wide use in the United States and elsewhere in which traffic signal lights at a street intersection are controlled automatically by timing circuits. In many instances, control boxes are provided with buttons, which may be operated by pedestrians, for either effecting or pre-empting control of the signal lights to provide a visual signal indicating that the signal lights are in such an operative condition that pedestrians may safely cross the intersection. In some cases, an audible signal may be provided as well from a loud speaker mounted in the vicinity of the intersection.

Many aids for blind pedestrians are known. Specially equipped canes are known; for example, a cane having mechanical means to detect obstacles in the path of a blind person is disclosed in U.S. Pat. No. 3,158,851. A cane using laser means and rather complicated optics or sending light signals and receiving, in reply, a return signal is known from U.S. Pat. No. 3,546,467.

U.S. Pat. No. 3,366,922 contains a disclosure of a system which includes a device worn like spectacles, an acoustic wave being transmitted to be reflected so as to be received by spaced receivers carried by the device, audible signals being produced in earphones. Apparatuses of similar type and purpose are disclosed in U.S. Pat. Nos. 3,742,433 and 3,718,896.

SUMMARY OF THE INVENTION

It is an object of the present invention to provide a traffic control system particular suitable for aiding blind pedestrians.

It is another object of the present invention to provide a traffic control system for aiding blind pedestrians which includes an interrogating unit and a responding unit, the interrogating unit being portable.

It is a further object of the present invention to provide a traffic control system for aiding blind pedestrians which includes an interrogating unit and a responding unit, the responding unit being effective to pre-empt control of the traffic signal lights.

It is an additional object of the present invention to provide a portable interrogating unit which may be used by blind pedestrians to determine the condition of traffic signal lights at traffic intersections which have a compatible responding unit.

It is yet another object of the present invention to provide a responding unit, which may be readily associated with otherwise conventional traffic control apparatus, for aiding blind pedestrians who wish to cross a street intersection and carry a compatible interrogating unit.

The foregoing objects, as well as others, are achieved in accordance with the present invention in its system aspect by a traffic control system for aiding blind pedestrians, which system includes an interrogating unit having means for producing a carrier signal modulated by a coded signal indicative of which direction its operator wishes to cross an intersection. The system includes a responding unit which produces and transmits a carrier signal, modulated by a coded signal corresponding to the coded signal received from the interrogating unit, when the operating condition of the traffic signal lights is such that safe crossing of the intersection is possible in the desired direction. The interrogating unit also is provided with means responsive to the coded signal received from the responding unit for producing a sensible signal at the interrogating unit indicating to the blind operator that the traffic signal light conditions are such that safe crossing of the traffic intersection is possible in the desired direction.

The interrogating unit and the responding unit are each desirably provided with respective FM transmitters, the respective coded signals being frequency modulated on respective carrier signals.

The modulators used in the interrogating unit and in the responding unit are preferably balanced modulators.

The frequency of the radio frequency carrier signals used for transmission from the interrogating unit and from the responding unit preferably differ. It is possible, however, to operate both FM transmitters at the same carrier frequency provided that the transmitter forming part of the responding unit also transmits a validity signal as modulation of its carrier, in this instance the validity signal, which can be a given tone, is used at the interrogating unit to determine if the received signal is from the responding unit and not from another interrogating unit or some other source. Of course, the coded modulation signals on the respective FM carriers desirably differ, to reduce the possibility of faulty operation, especially where the same frequency is used for both FM carriers.

The encoders used in both the interrogating unit and the responding unit are conventional, these encoders being preferably of the phase locked loop (PLL) type such as those used in touch tone telephone dialing systems. The decoders too are conventional, and are preferably of the phase locked loop type.

A carrier level discriminator is desirably provided in the receiving section of the interrogating unit to reduce the possibility of the receiving section being responsive to low level carrier signals from remote sources.

BRIEF DESCRIPTION OF THE DRAWING

FIG. 2 is a block diagram of an illustrative embodiment of an interrogating transmitter — receiver unit which may be used in a traffic control system according to the present invention.

FIG. 3 is a block diagram of an illustrative embodiment of a responding receiver-transmitter unit which may be used in a traffic control system according to the present invention.

DETAILED DESCRIPTION OF THE PREFERRED EMBODIMENT

Figure 1:
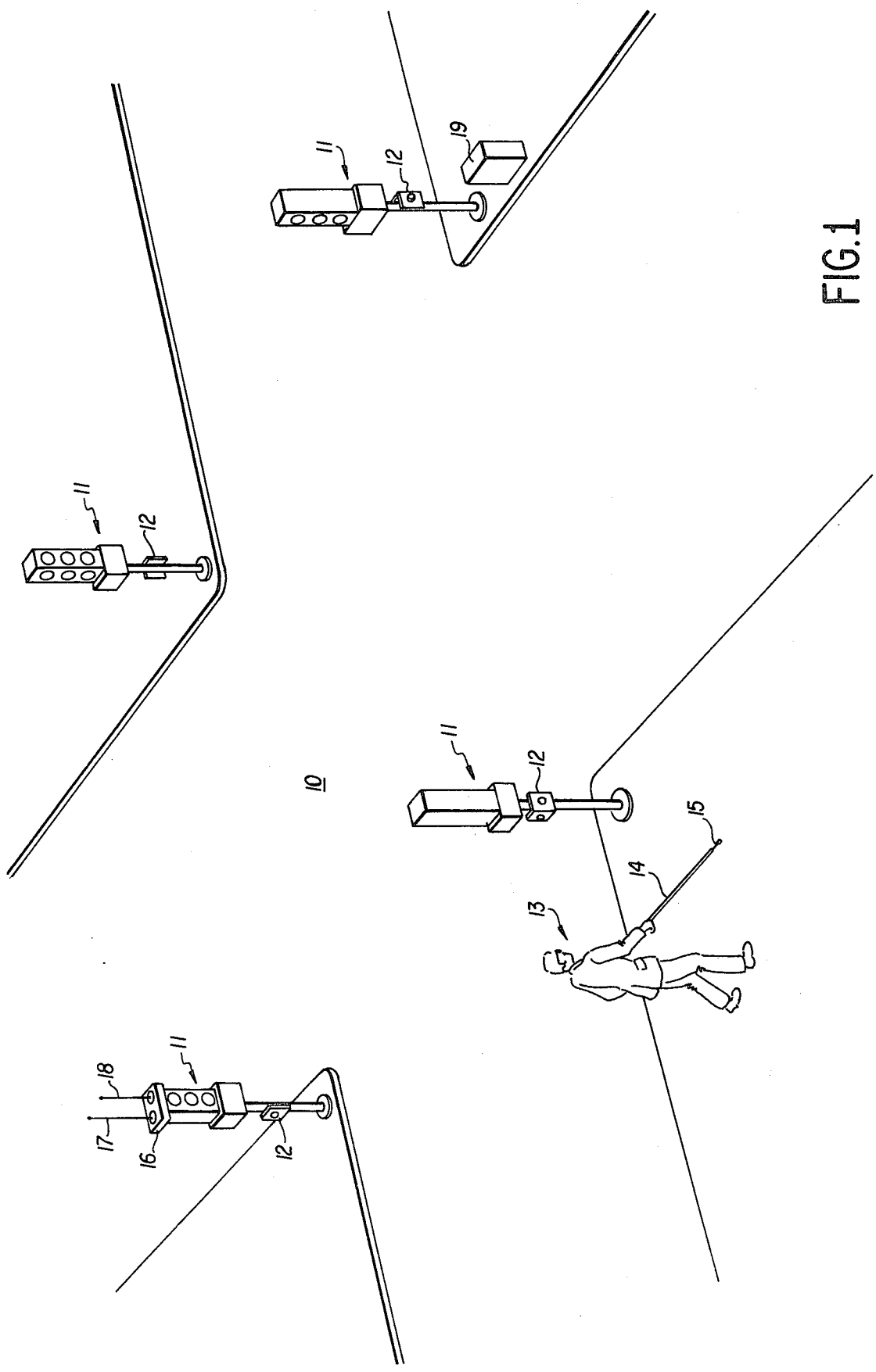
FIG. 1 is a perspective view of a street intersection, showing a responding unit and an interrogating unit, the latter being carried by a pedestrian.

As shown in FIG. 1, a street intersection 10 is provided with four traffic control signal light housings 11, each of the traffic control light housings 11 being supported conventionally on a respective pole. One of the poles is positioned on each corner of the intersection 10. On each pole, within easy reach of pedestrians, is a respective box 12 having two exposed push buttons which may be pushed by pedestrians to pre-empt control of the traffic control signal lights in the housings 11. Each of the housings 11 is provided with conventional lights for signaling vehicle drivers and pedestrians.

A blind pedestrian 13 is shown approaching the intersection 10 and carrying a specially equipped, but conventional appearing cane 14. As illustrated the cane 14 includes a retractable tip 15, the tip being spring biased to the extended position shown in FIG. 1. The tip 15 can be retracted by simply pushing downwardly on the cane 14 against the sidewalk, a conventional latch being provided within the cane 14 to hold the tip 15 in retracted position against the force of the biasing spring which is not visible in FIG. 1. The blind pedestrian 13, because of his disability, cannot see the lights provided from the traffic control signal light housings 11 nor can he readily locate the boxes 12 containing the pedestrian operable push buttons which pre-empt control of the signal lights within the traffic control signal light housings 11.

The cane 14 has housed within it an interrogating FM radio transmitter-receiver unit, not visible in FIG. 1. A responding FM radio receiver-transmitter unit 16 is positioned on the top of one of the traffic control signal light housings 11. A conventional receiving antenna 17 and a conventional transmitting antenna 18 extend upwardly from the top of the responding unit 16 for receiving and for transmitting respectively FM signals from and to the interrogating unit carried by the pedestrian 13 within the cane 14, the details of the interrogating unit being shown in conjunction with a cane 14 in FIG. 2. It is to be appreciated that in some instances, particularly when a low-level carrier frequency signal is used, a separate FM radio receiver-transmitter unit should be provided at each corner of the intersection.

Distribution of the power to the vehicular and pedestrian signaling lights is provided from a conventional timing control box 19 which includes circuits responsive to the closing of any of the pedestrian-operable push buttons within the boxes 12.

As shown in FIG. 2, the cane 14 is provided with the retractable tip 15, a biasing spring 20 being provided for holding the tip in its illustrated position. As mentioned above, a conventional latch (not shown) is provided within the cane 14 for holding tip 15 in its retracted position against the force of the biasing spring 20. All of the remaining parts shown in FIG. 2 constitute the interrogating transmitter-receiver unit and are housed within the cane 14, which appears to be a conventional cane carried by the blind person.

The interrogating unit includes a console 21 formed on the upper portion of the cane 14. Four push buttons are provided on the console 21, each individual push button representing a particular compass direction, as indicated by the letters N, S, E and W. Although many traffic intersections do not extend in true north-south and east-west directions, it is to be understood that a directional convention is desirably to be adopted by users of the system. Since blind persons do use north-south and east-west conventions to a great extent, applying them to street directions, which need not be true compass directions, the suggested convention is appropriate. A four position single switch can be used instead of the four push buttons on the console.

Figure 4:
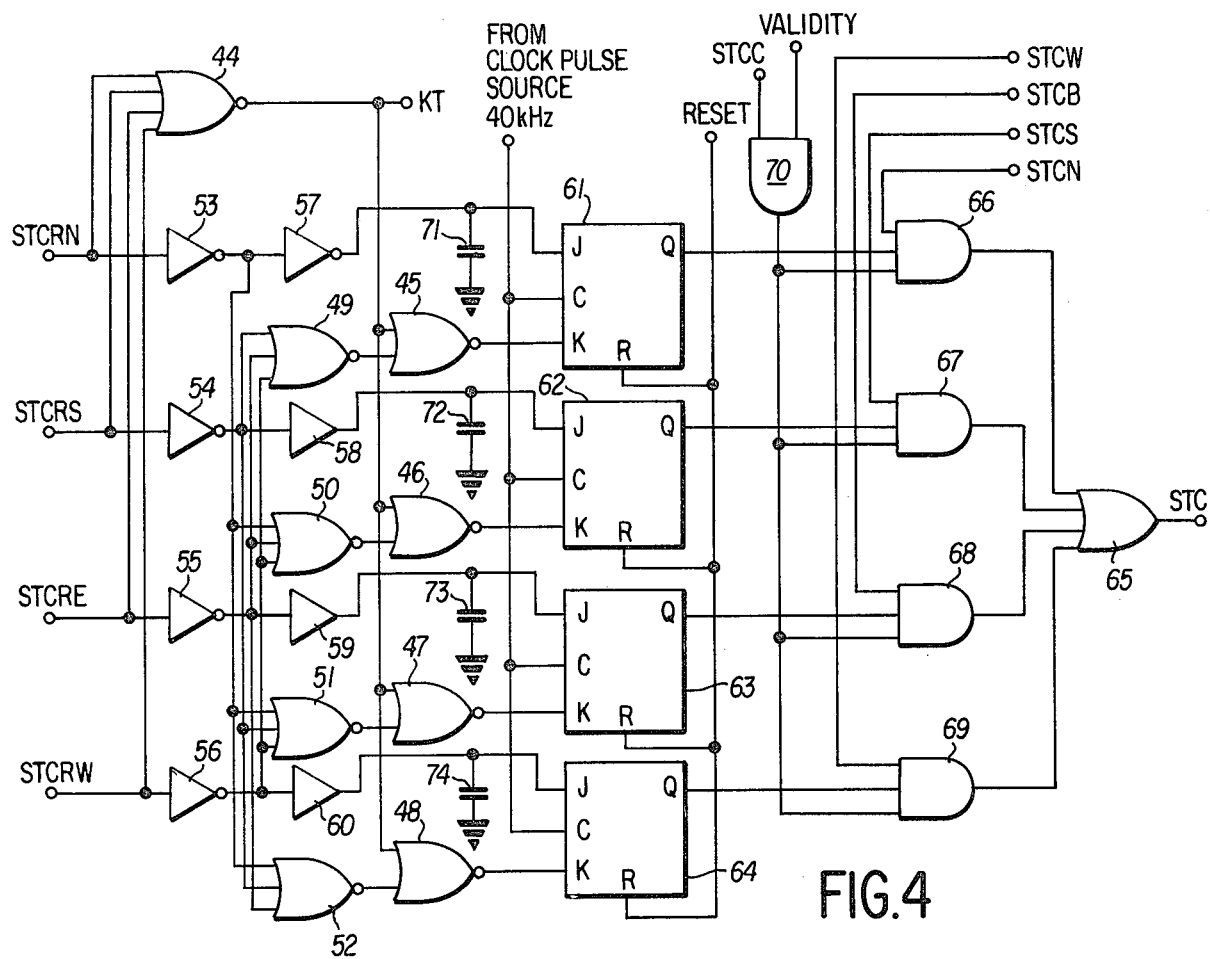
FIG. 4 is a schematic diagram of a logic circuit which may be used for the logic circuit forming part of the interrogating unit illustrated in FIG. 2.

The four push buttons on the console 21 are effective to provide on a selective basis ONE signals to the four inputs of a logic circuit 22, shown in detail in FIG. 4. For example, when the N push button is pushed, a ONE signal is fed to a particular one of the inputs to the logic circuit 22 which develops the keying signal which is used to turn on a FM transmitter 23. The four push buttons on the console 21 also provide respective ONE signals to a conventional phase locked loop (PLL) tone encoder 24, which is of the type used in touch tone dialing telephone systems.

The encoder 24 produces a specific predetermined coded tone signal, the frequency of which is determined by which of the four push buttons on the console 21 has been pushed, a particular respective frequency being reserved for each of the four directions.

The tone output from the encoder 24 is fed to a balanced modulator 25 which receives its radio frequency input from a R. F. oscillator 26. As illustrated, the R. F. oscillator 26 is a 50 MHz oscillator. The modulated output signal from the balanced modulator 25 is fed to transmitter 23 which has been keyed by the control signal from the logic circuit 22. The modulated output from the transmitter 23 is radiated from an antenna 27, which is housed within the cane 14.

The interrogating unit includes a receiving antenna 28, which like the transmitting antenna 27, is housed within the cane 14. The receiving antenna 28 is coupled to a FM receiver 29 which is tuned to respond to radio frequency FM signals from the responding receiver-transmitter unit 16 (FIG. 1), this unit being shown in detail in FIG. 3.

An I. F. output from the FM receiver 29 is fed to a carrier level discriminator 30 which develops a control signal whenever the carrier signal strength of the R. F. signal received by the antenna 28 is of a predetermined level or higher, the control signal being designated as STCC, meaning safe-to-cross carrier.

The FM receive 29 includes a demodulator which recovers the tone signals, its output being fed to a phase locked loop (PLL) tone decoder 31, which is of the type used in touch tone dialing telephone systems. The decoder 31 produces a ONE signal on a selected one of four of its output lines, its presence indicating receipt of a particular one of the safe-to-cross (STC) signals from the responding unit 16 (FIG. 1). The decode 31, upon receipt of a validity tone signal from the FM receiver 29, produces a ONE signl on its fifth output line. All five of the output lines from the decoder 31 are connected to inputs of the logic circuit 22.

The logic circuit 22, provided that it has been set in one of four possible ready states by the depression of one of the directional buttons on the console 21, produces, as its output, a ONE signal whenever it receives a ONE validity signal from the decoder 31 a ONE STCC signal from the discriminator 30 and a ONE signal from a particular one of the connections from the decoder 31 which represents the same direction as that of the particular push button on the console 21 which was pushed.

The output ONE signal from the logic circuit 22 is a safe-to-cross (STC) signal and is fed to a driver 32 which, in turn, has its output coupled to a gated audio oscillator 34 as its enabling signal, the audio oscillator having its output fed to a loud speaker 35 which produces a short bust of tone indicating to the blind pedestrian that it is safe to cross the intersection in the desired direction. As shown, the output of the driver 32 is also coupled to an electrical-to-mechanical transducer 33 which effects a delatching of the latch holding the tip 15 of the cane 14 in its retracted position, causing the spring 20 to extend the tip 15. The blind pedestrian, feeling the tip of his cane 14 push his cane upwardly, can thus determine that it is safe to cross the intersections in the desired direction. The transducer 33 can, if desired, be arranged to move another part of the cane 14, which movement may be sensed by the hand of the blind pedestrian.

Although both a loudspeaker 35 and a transducer 33 are shown, it is to be understood that in practice one of these members need to be used. Of course, if the loudspeaker 35 were not used, the audio oscillator 34 also need not be present.

The responding receiver-transmitter 16 (FIG. 1), as illustrated in detail in FIG. 3, includes the receiving antenna 17 and the transmitting antenna 18, these antennas being shown schematically in FIG. 3. As shown in FIG. 3, the receiving antenna 17 is coupled to a FM receiver 36 which includes a conventional FM demodulator for recovering the modulation from the carrier. The output signal from the FM receiver 36, which has one or another of the four possible audio frequencies with which the R.F. carrier from the oscillator 26 was modulated, is fed to a phase locked loop (PLL) tone decoder 37 which produces a ONE signal on one or another of its four output lines, depending on which audio tone appears on the output from the FM receiver 36.

Figure 6:
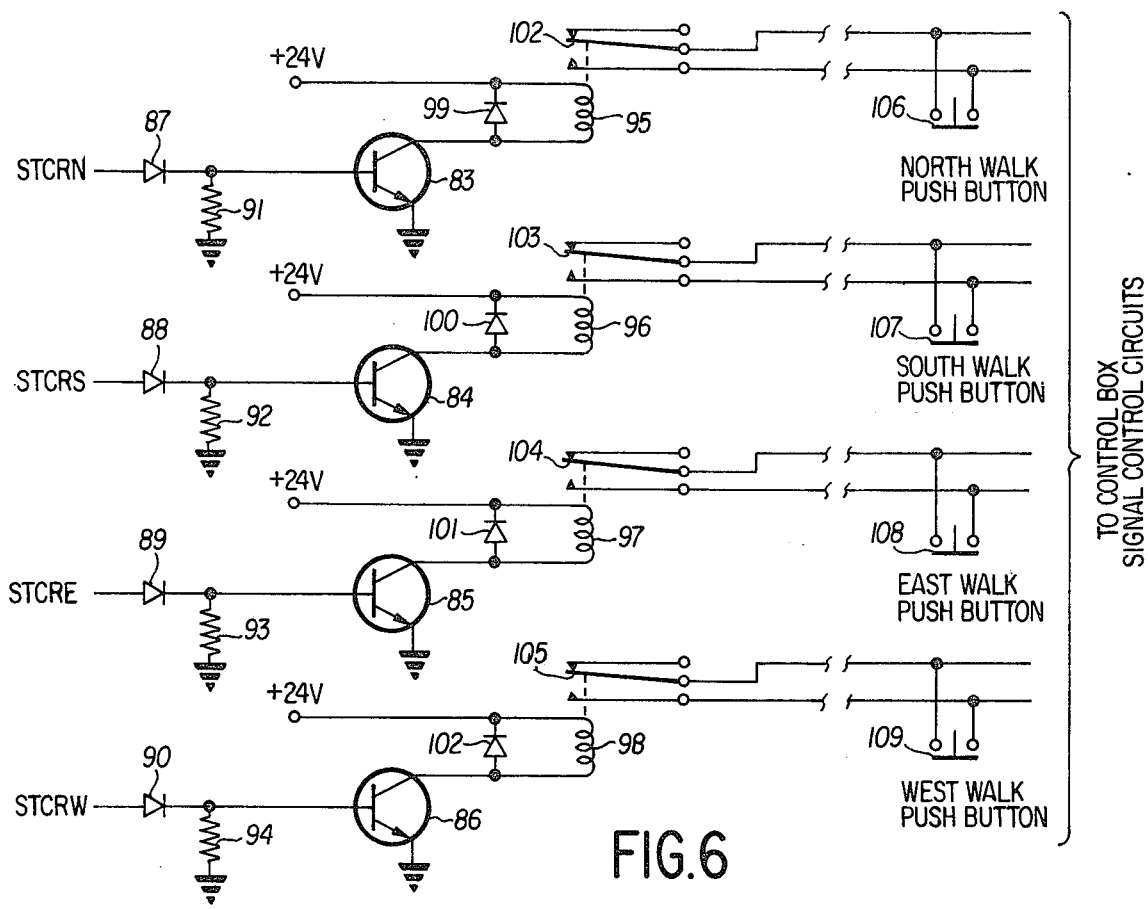
FIG. 6 is a schematic diagram of a portion of the relay package which may be used as the relay package orming part of the responding unit illustrated in FIG. 1, the portion shown being that portion of the relay package which effects a pre-emption of the control unction.
Figure 7:
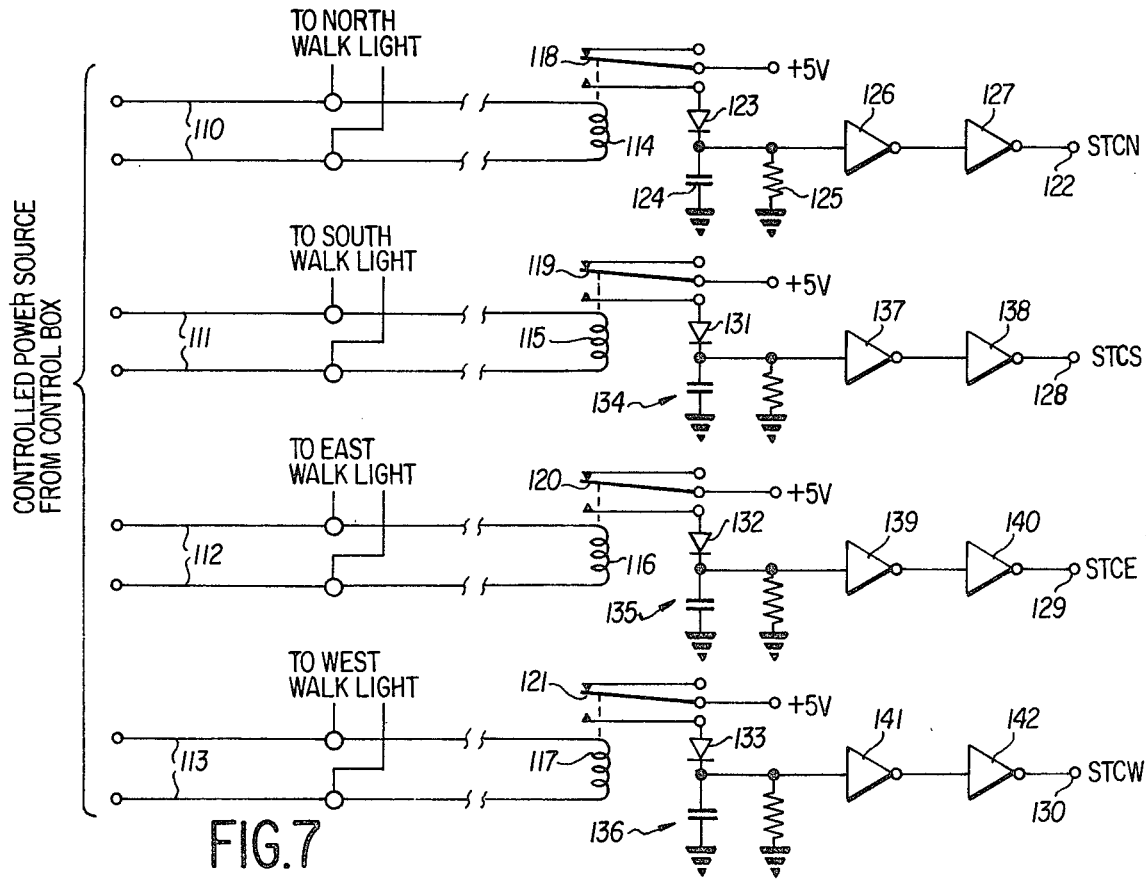
FIG. 7 is a schematic diagram of a portion which levelops safe-to-cross signals for encoding.

A relay package 38, which is shown in more detail in FIGS. 6 and 7, is connected to the four output lines from the decoder 37. The relay package is interconnected to conventional traffic signal control circuits 39, which are housed within the timing control box 19, so as to provide, on the one hand, four inputs to the traffic signal control circuit 39 which correspond to inputs these circuits receive from the depressing of the push buttons housed in the boxes 12 (FIG. 1). Thus, a blind pedestrian can, in effect, electronically "push" the otherwise manually operated push buttons and preempt control of the traffic control lights. This is understandably very desirable from the point of view of blind persons.

On the other hand, the relay package 38, as seen in more detail in FIG. 7, receives four possible inputs from the traffic signal control circuits 39, these four inputs indicating which of the four pedestrian "walk" signal lights is currently energized.

In response to the four possible ONE signals from the decoder 37, only one appearing at any given time, and the four possible signals indicating the energization condition of the "walk" signal lights from the control circuits 39, the relay package produces a safe-to-cross direction signal (STCN, STCS, STCE AND STCW) on a one of its four output lines whenever it receives, at the same time, a signal from the control circuits 39 indicating that a particular "walk" signal light is energized and a signal from the decoder 37 indicating that the responding unit 16 has received a corresponding safe-to-cross-request-direction signal (STCRN, STCRS, STCRE and STCRW) from an interrogating unit.

The output signal from the relay package 38, a STCN, STCS, STCE, or STCW signal, as the case may be, is coupled to a phase locked loop (PLL) tone encoder 40, which produces one or another of four possible audio frequency signals, the individual frequencies indicating safe-to-cross conditions in a particular interrogated direction. Any one of four possible output signals from the encoder 40, which can be considered to be respectively STCN, STCS, STCE and STCW audio signals, is fed to a balanced modulator 41 as a modulating signal. The encoder 40 also supplies a further audio signal to the balanced modulator, this further audio signal having a predetermined frequency differing from the frequencies of the respective possible STCN, STCS, STCE and STCW audio frequency signals. This further audio signal, which can be considered to be a VALIDITY signal, is produced whenever any one of the possible STCN, STCS, STCE and STCW audio frequency signals are produced by the encoder 40.

The balanced modulator 41, which receives its radio frequency input from an R.F. oscillator 42, shown as a 40 MHz oscillator, frequency modulates the received radio frequency signal with the two audio frequency signals it receives simultaneously from the encoder 40, one of these signals being the audio frequency VALIDITY signal and the other being one or another of the audio frequency STCN, STCS, STCE and STCW signals. It is to be appreciated that the particular frequency selected for this R.F. oscillator 42, from a technical viewpoint, can be in any number of bands. Of course, as a practical matter, the frequency selected for the use in the U.S. would be subject to regulation by the FCC.

The frequency modulated signal from the balanced modulator 41 is fed to a FM transmitter 43 to which the transmitting antenna 18 is connected. The frequency modulated signal radiated from the antenna 18 is received by the interrogating unit via its receiving antenna 28.

The logic circuit 22 (FIG. 2) is shown in detail in FIG. 4. As shown in FIG. 4, the logic circuit includes four input lines on which may respectively appear initial safe-to-cross-request directional signals (initial STCRN, STCRS, STCRE and STCRW signals) as a result of the respective depressing of any one of the push buttons labeled N, S, E, and W on the console 21 (FIG. 2). It is to be understood that depressing of any one of the push buttons on the console 21 simply places a direct voltage from a battery (not shown) on one or another of the aforementioned input lines to the logic circuit.

Each of the lines, on which the initial STCRN, STCRS, STCRE and STCRW signals may appear, is connected to a NOR function circuit 44 on whose output appears an inverted key-transmitter (KT) signal whenever one or another of the push buttons on the console 21 (FIG. 2) is depressed, this signal being used to key the transmitter 23 (FIG. 2), which includes a circuit for inverting the output from the NOR circuit 44.

The output signal from the NOR circuit 44 is also coupled to one input of each of four NOR function circuits 45–48, a second input to each of the NOR function circuits 45–48 is provided from respective NOR function circuits 49–52, these NOR function circuits 49–52 having respective ones of their three inputs coupled to different groups of three of the input lines for the initial STCRN, STCRS, STCRE and STCRW signals, via inverter function circuits 53–56. Each of the inverter function circuits 53–56 has its output connected to respective inputs of inverter function circuits 57–60 which, in turn, have their respective outputs connected to a J input terminal of respective JK flip-flops 61–64, which input connections are provided respectively with smoothing capacitors 71–74. The K input terminal of the JK flip-flops 61–64 is connected to respective outputs from the NOR function circuits 45–48.

A clock input terminal of each of the flip-flops 61–64 is connected to a source of clock pulses (not shown), the repetition rate of the pulses from the clock pulse source may be, as illustrated, 40 KHz. In practice, the repetition rate should be above the audio range, a frequency above about 25 KHz would be sufficient. The reason for not using an audio frequency is to avoid possible audible vibrations which might be mistaken for a safe-to-cross signal.

Each of the JK flip-flops 61–64 is provided with a common reset input connection. A reset input signal can be provided from any number of points within the interrogating unit; for example, a reset input signal may be derived from the output of an OR function circuit 65, which is the final output point of the logic circuit, to which further reference is to be made below. The OR function circuit 65 is provided with four inputs, each being from a different one of four three-input AND function circuits 66–69. One input to each of the AND function circuits 66–69, is provided respectively from the Q output terminal of the respective JK flip-flops 61–64. A second input to each of the AND function circuits 66–69 is provided from a respective one of the four outputs from the decoder 31 (FIG. 2) which constitute respectively the decoded STCN, STCS, STCE and STCW signals. The third input to each of the AND function circuits 66–69 is provided from a two-input AND function circuit 70 which has its inputs coupled respectively to the decoded VALIDITY signal carrying line from the decoder 31 (FIG. 2) and to the safe-to-cross output line from the carrier level discriminator 30 (FIG. 2).

In operation, one or another of the JK flip-flops 61–64, for example flip-flop 61, is set whenever the blind pedestrian 13 (FIG. 1) depresses one of the push buttons on the console 21 (FIG. 2) thereby providing an output ONE signal from its Q terminal to one input terminal of one or another of the AND function circuits 66–69, for example AND function circuit 66.

When the responding unit, shown in FIG. 3, transmits a frequency modulated signal, as a result of being interrogated, the interrogating unit of FIG. 2 receives the signal and produces a ONE signal as a safe-to-cross carrier level signal (STCC), indicating the carrier level is sufficiently high to most probably have been generated by the nearest responding unit, this ONE signal being provided to one input terminal of the AND function circuit 70, its other input terminal receiving a ONE signal as the VALIDITY signal from the decoder 31 (FIG. 2), indicating that the received radio frequency signal did indeed originate from a responding unit, rather than some other spurious source. Whenever the just-mentioned signals are both present, the AND function circuit 70 provides a ONE output signal to the third input connections of the four AND function circuits 66–69.

Since one of the AND function circuits 66–69, for example the AND function circuit 66, also has received ONE signals at its other two input connections, it provides a ONE signal on its output causing the OR function circuit 65 to respond. The OR function circuit 65 provides a ONE signal at its output connection, this being the final safe-to-cross signal (STC), which is provided as the input signal to the driver 32 (FIG. 2). Thus, the transducer 33 (FIG. 2) effects the release of the latch within the cane 14 causing the spring 20 to push the tip 15 of the cane upwardly. This causes the cane 14 to move abruptly indicating to the blind pedestrian 13 (FIG. 1) holding the cane 14 that it is safe to cross the intersection 10 in the desired and interrogated direction. The output from the driver 32 (FIG. 2) could also gate on the audio oscillator 34 causing the loudspeaker 35 to emit a distinct tone indicating that safe crossing light conditions exist in the desired direction. It is to be understood that either one or both the transducer 33 and the loudspeaker 35 are provided.

Figure 5:
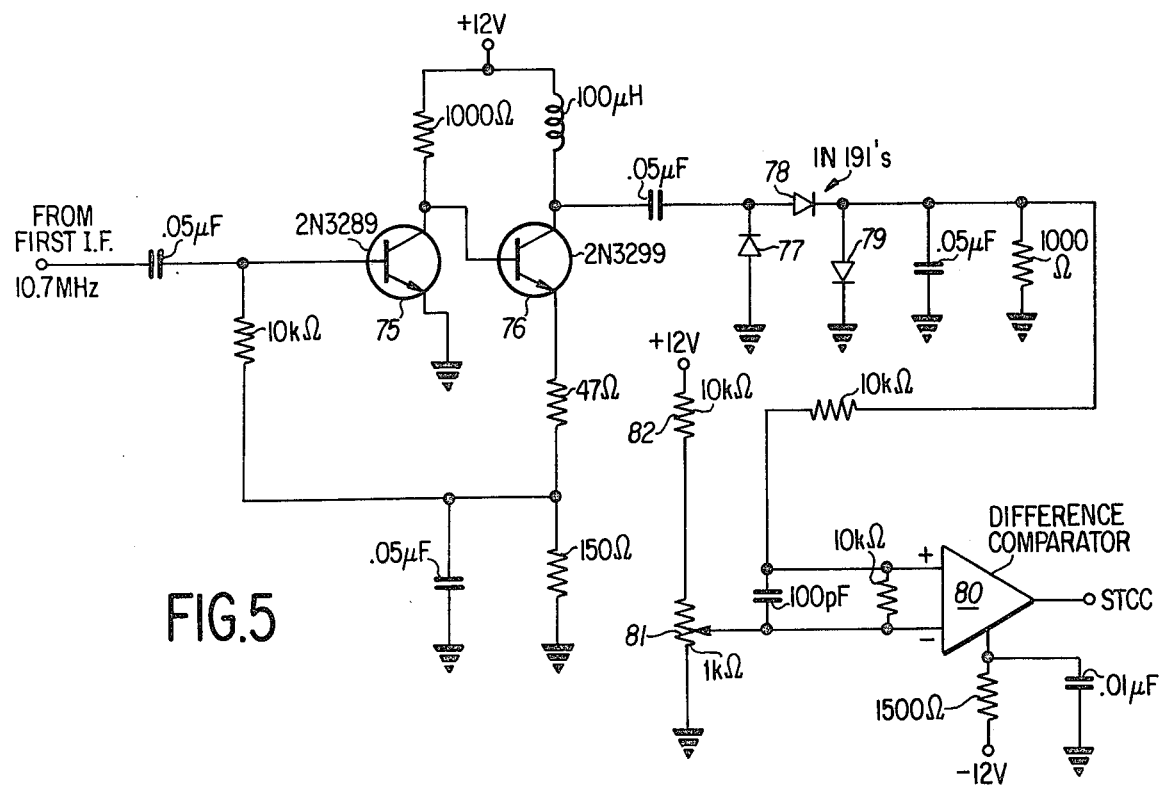
FIG. 5 is a schematic diagram of a carrier level discriminator which may be used for the carrier level discriminator forming part of the interrogating circuit illustrated in FIG. 2.

The carrier level discriminator circuit 30 (FIG. 2) may take many conventional forms, one suitable circuit being shown in FIG. 5. Since the circuit of FIG. 5 is conventional it need not be described in detail. The component values and transistor types indicated are suitable for use in conjunction with an I.F. of 10.7 MHz. The received I.F. signal is amplified in an amplifier constituted by directly coupled transistors 75 and 76, the amplified signal being rectified and limited by the arrangement of diodes 77–79, the output being integrated and fed to the plus (+) input terminal of a difference comparator 80. The minus (−) input terminal of the difference comparator 80 is connected to the movable output connection of a potentiometer 81 which, with a fixed resistor 82, forms a voltage divider. Whenever the plus input terminal of the comparator 80 receives a signal which is greater than the set point of the voltage fed to the minus input terminal, the comparator produces a ONE signal, constituting an indication of proper carrier signal level, the signal being the STCC signal supplied to the logic circuit 22 (FIG. 2).

In FIG. 6, that portion of the relay package 38 (FIG. 3) which produces respective pre-emptive signals to be supplied to the traffic signal control circuits 39 is shown in detail. The respective STCR direction signals are supplied, individually as they may occur to respective grounded-emitter transistor amplifiers 83–86, via respective isolating diodes 87–90, the cathode of each of the diodes 87–90 being connected to ground via respective resistors 91–94 which constitute the external base-emitter paths for the transistor amplifiers 83–86. The collectors of the respective transistor amplifiers 83–86 are connected to a 24 volt D.C. power supply via respective, individual solenoid windings 95–98, each of the windings having a respective protective diode 99–102 connected in parallel with it. The solenoids 95–98 are arranged to open and close respective pairs of contacts 102—103 which are connected in parallel with the respective manually operable "walk" push buttons provided in the boxes 12 for use of sighted pedestrians, four of these buttons being numbered respectively 106–109 in FIG. 6. Thus, the circuit of FIG. 6 provides, in operation, an arrangement for electronically performing the same function as the manually operable "walk" push buttons.

In FIG. 7, that portion of the relay package 38 (FIG. 3) which produces the initial four possible safe-to-cross directional signals, indicated in FIG. 7 respectively as STCN, STCS, STCE and STCW signals, is shown in detail. The power inputs to the circuit shown in FIG. 7 is provided from the traffic control box 19 (FIG. 1) which, in addition to energizing selectively respective "walk" signal lights via respective current carrying power lines 110–113, selectively energizes respective solenoid windings 114–117. Thus, one or another of the solenoid windings 114–117 is energized whenever a corresponding "walk" signal light is inergized. Each of the solenoid windings 114–117 is respectively operatively associated with respective pairs of contacts 118–121. Thus, for example when power appears on the power lines 110 to energize the North "walk" signal light, the solenoid 114 is also energized, closing the contact pair 118 placing 5 volts D.C. on the lower contact pair 118 thereby supplying a STCN direct voltage signal to an internal terminal 122 within the relay package (FIG. 3) via a diode 123, a long time constant circuit constituted by parallel connected, grounded capacitor 123 and resistor 125, and two series connected inverters 126 and 127. The circuit elements 123–127 constitute the North "walk" signal light on sensing channel. The STCN signal, which appears on the internal terminal 122, is passed on to the encoder 40 (FIG. 3) via a gate circuit controlled by that one of the output signals from the decoder 37 which indicates receipt of a request for a safe North directional crossing of the intersection 10 (FIG. 1). The pairs of contacts 119–121 are respectively coupled to respective internal terminals 128–130 via respective diodes 131, 132 and 133, long time constant circuits 134, 135 and 136 pairs of series connected inverters 137, 138 and 139, 140 and 140, 141, as shown in FIG. 7. These circuit elements constitute the South, East and West "walk" signal light on sensing channels, which function in the same manner as the North "walk" signal light on sensing channels. The STCS, STCE and STCW direct voltage signals which may appear on the terminals 123–125, like the STCN direct voltage signal which can appear on the terminal 122, are passed on to the encoder 40 (FIG. 3) via respective gate circuits controlled by signals from the decoder.

The operation of the traffic control system can be best understood by considering an operational sequence, reference being made to FIGS. 1–3. The blind pedestrian 13, having determined that he is approaching a signal-light traffic controlled intersection elects to cross the intersection in a particular direction, for example, in the North direction. Consequently he deresses the N button on the console 21 thereby providing ONE input signal to the logic circuit 22 which, in turn, produces a key-transmitter signal, which turns on the FM transmitter 23. The ONE signal to the logic circuit 22 from the console also sets one of the four JK flip-flop circuits therein, this specific flip-flop circuit remaining in this particular condition until reset. Had a different directional button on the console 21 been depressed, a different one of the four flip-flop circuits would have been set.

The ONE signal from the console 21, produced by depressing the button labeled N, is also sent to the phase locked loop tone encoder 24, causing it to produce an audio signal of predetermined frequency, asssinged as a code for the North direction. This audio signal is fed to the balanced modulator 25. The balance modulator 25 effects a frequency modulation of the R.F. signal received from the oscillator 26, the thus modulated signal being fed to the transmitter 23, which has been turned on by the keying signal received from the logic circuit 22.

The modulated radio signal from the FM transmitter 23, radiated by the antenna 27 is received at the antenna 17 of the responding unit 16. Demodulation of the received frequency modulated signal is effected by a conventional demodulator within the FM receiver 36, the recovered audio signal of the predetermined frequency being fed to the phase locked loop tone decoder 37.

The decoder 37 produces a ONE output signal on a specific one of its four output lines, thereby indicating receipt by the responding unit of a STCRN signal. The relay package 38, as was pointed out above, is provided with signals indicating the condition of the respective North, South, East and West "walk" signal lights and produces a ONE signal on one of its four output lines to the encoder 40 indicating that the north "walk" lights ar energized and that a STCRN signal has been received.

The ONE signal constitutes the initial STCN signal which is fed to the encoder 40. Upon receipt of the initial STCN signal from the relay package 38, the encoder 40 produces two distinct audio frequencies signals. One of the audio frequency signals constitutes the VALIDITY signal and the other audio signal constitutes the coded STCN signal. These two audio frequencies signals from the encoder 40 are fed to the balance modulator 41 which effects a frequency modulation of the radio frequency signal which it receives from the R.F. oscillator 42. The thus modulated signal is supplied to the FM transmitter 43, and radiated from its associated antenna 18.

The coded frequency modulated signal from the antenna 18, is received by the FM receiver 29, from its associated antenna 28. The FM receiver 29 includes a conventional demodulator, which recovers the two audio signals from the carrier signal, these audio signals being supplied to the phase locked loop tone decoder 31.

In response to the two audio frequencies signals received, the phase locked loop decoder 31 produces a ONE signal on a first of its five output lines, indicating the presence of the VALIDITY signal, and a ONE signal on a particular one of its other four output lines, indicating receipt of the coded STCN signal. The FM receiver 29 also supplies its first I.F. signal to the carrier level discriminator 30 which produces a ONE signal constituting the STCC signal provided that the discriminator 30 determines that the carrier level of the received radio signal exceeds a predetermined minimum level.

The logic circuit 22, which has been set in a particular one of its four possible states by the depressing of the N button on the console 21, produces a ONE signal as the STC signal upon simultaneous receipt of the ONE signal from the decoder 31 constituting the decoded VALIDITY signal, a ONE signal from the carrier level discriminator 30 constituting the STCC signal and a ONE signal from the decoder 31 constituting the decoded STCN signal.

The STC signal from the logic circuit 22 is supplied to the driver 32 which drives the electrical-to-mechanical transducer 33 causing the tip 15 of the cane 14 to be unlatched thereby indicating to the blind pedestrian 13 that it is safe to cross the intersection 10 in the desired direction. The driver 33 also may enable the audio oscillator 34, if present, thereby producing an audible sound from the loud speaker 35.

The entire interrogating unit can, as illustrated, fit easily into a standard walking cane or a box about the size of a package of cigarettes and weigh between 4 and 5 ounces, less batteries. The responding unit, constructed from readily available, conventional components can be about the size of an average lunch box, and will weigh from one and one-half to 2 pounds.

The use of a complimentary Metal Oxide semiconductor (CMOS) logic chip is recommended for the logic circuit 22, because this type logic requires far less power than conventional saturated logic. The interrogating unit desirably should also include some form of power supply polarity reversal protection means to protect the logic circuit in the event the battery(s) are improperly inserted. The clock pulse source may be provided on the same chip as the logic circuit components or as a separate component.

The illustrated embodiment of the system of the present invention uses frequency modulation. It is to be appreciated, however, that virtually any type of modulation could be used, frequency modulation being preferred simply because such systems are less responsive to electrically produced interference signals, such as those produced by the ignitions systems used in automobiles. Although coded tone signals are used in the illustrated embodiment, any distinctive coded signals could be used equally well.

It is suggested that the tone frequencies selected for use be based on the multiple of several prime numbers (i.e. 1100 Hz, 1300 Hz, 1700 Hz, and 2300 Hz) to eliminate possible undesirable interaction.

The traffic control system of the present invention, although described and illustrated in the context of aiding blind pedestrians, can be put to many uses. For example, the system could be used within material storage yards and manufacturing plants to control traffic flow, sighted persons using the interrogating units.

It is to be appreciated that although the present invention has been described and illustrated in conjunction with pole supported traffic signal lights, it is equally useful in conjunction with traffic signal lights which are differently supported, such as those which are suspended over a traffic intersection.

Although the present invention has been described and illustrated in conjunction with traffic signal lights which include distinct pedestrian walk signal lights, it is to be appreciated that it is equally applicable to traffic light arrangements which do not have separate WALK lights for pedestrians, such as arrangements in which a single green light is used both as the pedestrian walk light and the vehicle driver control light in a given direction.

The single embodiment of a traffic control system described and illustrated herein has been set out by way of example, not by way of limitation. It is to be appreciated that numerous other embodiments and varients are possible within the spirit and scope of the invention, the scope being defined in the appended claims.

What is claimed is:

1. In a traffic control system having at least one set of traffic signal lights at a traffic intersection and traffic signal control circuit means coupled to said set of traffic signal lights, the improvement comprising:
   a. at least one portable interrogating unit having manually operable means for producing selectively a signal indicative of desired crossing direction, and means coupled to said manually operable means and responsive to the signal indicative of desired crossing direction for transmitting a safe-to-cross directional request signal; and
   b. a stationary responding unit having means coupled to said traffic signal control circuit means and responsive to signals therefrom, which correspond to energization conditions of said signal lights, and to the safe-to-cross directional request signal received for producing a safe-to-cross particular directional signal upon occurrence of a signal from said signal control circuit means indicative of signal light energization conditions acceptable for safe crossing in the desired direction, and means coupled to said means for producing the safe-to-cross particular directional signal and responsive thereto for transmitting said safe-to-cross particular directional signal; and
   c. means forming part of said interrogating unit which receive and respond to the safe-to-cross particular directional signal transmitted from said responding unit for producing a safe-to-cross signal sensible to persons who may operate said portable interrogating unit.

2. An improved traffic control system as defined in claim 1, wherein said interrogating unit includes a cane, said manually operable means, said means for transmitting a safe-to-cross directional request signal and said means for producing a safe-to-cross signal sensible to persons being housed within said cane.

3. An improved traffic control system as defined in claim 1, wherein said means for producing a safe-to-cross signal sensible to persons comprises loudspeaker means.

4. An improved traffic control system as defined in claim 1, wherein said means for producing a safe-to-cross signal sensible to persons comprise electrical-to-mechanical transducer means.

5. An improved traffic control system as defined in claim 4, wherein said interrogating unit includes a cane having a retractable tip, said transducer means being coupled to said tip for extending said tip when energized.

6. An improved traffic control system as defined in claim 1, wherein said means coupled to said manually operable means comprises means for encoding safe-to-cross directional request signals and radio transmitting means for transmitting coded safe-to-cross directional request signals.

7. An improved traffic control system as defined in claim 6, wherein said responding unit includes radio receiving means for receiving radio signals from said radio transmitting means, and means coupled to said radio receiving means for decoding received coded safe-to-cross directional request signals.

8. An improved traffic control system as defined in claim 7, wherein said means forming part of said responding unit for producing the safe-to-cross particular directional signal includes further means for encoding safe-to-cross particular directional signals and further radio transmitting means for transmitting coded safe-to-cross particular directional signals.

9. An improved traffic control system as defined in claim 8, wherein said further means for encoding includes means for producing a validity signal.

10. An improved traffic control system as defined in claim 8, wherein said interrogating unit includes further radio receiving means for receiving radio signals from said further radio transmitting means, and further means coupled to said further radio receiving means for decoding received coded safe-to-cross particular direction signals.

11. An improved traffic control system as defined in claim 10, wherein said interrogating unit includes logic circuit means coupled to said further means for decoding and to said manually operable means and responsive to signals from these components for selectively producing an electrical output safe-to-cross signal.

12. An improved traffic control system as defined in claim 11, wherein said means for producing a safe-to-cross signal sensible to persons comprises transducer means coupled to said logic circuit means and responsive to its output signal.

13. A portable interrogating unit comprising manually operable means for producing selectively a signal indicative of desired traffic intersection crossing direction, transmitting means coupled to said manually operable means and responsive to the signal indicative of desired crossing direction for transmitting a safe-to-cross directional request signal to a responding unit, and means which receive and respond to safe-to-cross particular directional signals from a responding unit responsive to the request signal for producing a safe-to-cross signal sensible to persons who may operate the portable interrogating unit.

14. A portable interrogating unit as defined in claim 13, wherein said portable interrogating unit includes a housing, said housing being developed as a cane.

15. A responding unit including traffic control circuit means for controlling at least one set of traffic signal lights, means coupled to said traffic signal control circuit means and responsive to signals therefrom, which correspond to energization conditions of the signal lights, and to safe-to-cross directional request signals from an interrogating unit for producing a safe-to-cross particular directional signal upon occurrence of a signal from said signal control circuit means indicative of signal light energization conditions acceptable for safe crossing in the desired direction, and means coupled to said means for producing the safe-to-cross particular directional signal and responsive thereto for transmitting said safe-to-cross particular directional signal.

* * * * *